United States Patent [19]

Moro et al.

[11] Patent Number: 5,040,082
[45] Date of Patent: Aug. 13, 1991

[54] RECORDING APPARATUS

[75] Inventors: Shuuji Moro; Jun Hirai, both of Tokyo; Masahiro Kiko, Chiba, all of Japan

[73] Assignee: Sony Corporation, Tokyo, Japan

[21] Appl. No.: 472,881

[22] Filed: Jan. 31, 1990

[30] Foreign Application Priority Data

Feb. 7, 1989 [JP] Japan .................. 1-27883

[51] Int. Cl.$^5$ .................. G11D 5/02; H04N 5/78
[52] U.S. Cl. .................. 360/27; 360/33.1
[58] Field of Search .................. 360/27, 28, 65, 67, 360/132

[56] References Cited

U.S. PATENT DOCUMENTS

| | | | |
|---|---|---|---|
| 4,422,108 | 12/1983 | Sampei et al. | 360/65 |
| 4,743,984 | 5/1988 | Ryan | 360/132 |
| 4,786,986 | 11/1988 | Yamanushi et al. | 360/27 |
| 4,892,266 | 1/1990 | Tanaka et al. | 360/132 |
| 4,903,159 | 2/1990 | Kawano | 360/132 |

FOREIGN PATENT DOCUMENTS

EP228240 12/1986 European Pat. Off.
EP249482 12/1987 European Pat. Off.
EP265930 5/1988 European Pat. Off.

OTHER PUBLICATIONS

IEEE Transactions on Consumer Electronics, No. 3, Aug. 1988, New York, pp. 560-564.
Funkschau, No. 13, Jun. 1983, Munich, pp. 57-58.
Funkschau, No. 20, Sep. 1989, Munich, pp. 62-67.

Primary Examiner—Aristotelis M. Psitos
Assistant Examiner—Varsha V. Sheladia
Attorney, Agent, or Firm—Lewis H. Eslinger; Donald S. Dowden

[57] ABSTRACT

A tape recording apparatus is capable of operation in either a normal recording mode or a high band recording mode. Detecting holes to indicate whether a tape cassette loaded into the recording apparatus is designed for the normal recording mode or the high band recording mode are formed in the tape cassette. The kind of cassette is detected from the detecting holes, and the high band recording mode or the normal recording mode is automatically set in accordance with the kind of tape cassette detected. The automatic setting can be selectively cancelled, however, in which case the recording can be executed in the normal recording mode even if a tape cassette designed for the high band recording mode has been loaded into the recording apparatus.

4 Claims, 3 Drawing Sheets

Fig. 2

| STATE OF TAPE KIND DETECTING HOLE 6 | STATE OF DETECTING HOLE 4 | KIND OF TAPE |
|---|---|---|
| OPEN | CLOSED | HIGH ME TAPE CASSETTE |
| CLOSED | OPEN | HIGH MP TAPE CASSETTE |
| CLOSED | CLOSED | NORMAL MP TAPE CASSETTE |

Fig. 3

| STATE OF TAPE KIND DETECTING HOLE 6 | STATE OF DETECTING HOLE 4 | KIND OF TAPE |
|---|---|---|
| OPEN | OPEN | SUPER HIGH ME TAPE CASSETTE |
| CLOSED | OPEN | HIGH ME TAPE CASSETTE |
| CLOSED | OPEN | HIGH MP TAPE CASSETTE |
| CLOSED | CLOSED | NORMAL MP TAPE CASSETTE |

RECORDING APPARATUS

BACKGROUND OF THE INVENTION

1. Field of the Invention

The present invention relates to apparatus for recording a video signal and, more particularly, to a recording apparatus that can be selectively set into a normal mode or a high band mode.

2. Description of the Prior Art

In a rotary head type videotape recorder (VTR) in which the luminance signal is frequency modulated and the chroma signal is converted into a low band frequency and recorded, the horizontal resolution and thus the picture quality can be improved by raising the carrier frequency when the luminance signal is frequency modulated and by widening the frequency deviation. Therefore, in such a VTR, it is good practice to provide a recording mode in which, when the luminance signal is frequency modulated, the carrier frequency is set to be higher than the frequency that has conventionally been used, thereby improving the picture quality.

Hitherto, in the recording format of, for example, an 8-mm VTR, the carrier frequency when the luminance signal is frequency modulated has been set to 4.2 MHz at the sync tip level and 5.4 MHz (or higher by 1.2 MHz) at the white peak level. In such an 8-mm VTR, in order to realize high picture quality, it is common practice to set the carrier frequency when the luminance signal is frequency modulated to 5.7 MHz at the sync tip level and 7.7 MHz (or higher by 2.0 MHz) at the white peak level. Such a recording mode is hereinafter called a high band mode. The conventional recording mode is hereinafter called a normal mode.

In order to improve the picture quality still further the carrier frequency when the luminance signal is frequency modulated is sometimes set to 7.0 MHz at the sync tip level and 9.0 MHz at the white peak level. Such a recording mode is hereinafter called a super high band mode.

In a VTR that can record in the high band mode or the super high band mode in addition to the normal mode, it is necessary to control various components of the VTR in accordance with the recording mode. That is, it is necessary to switch the characteristics of the FM demodulator, the pre-emphasis characteristics, the characteristics of the recording amplifier, and the like in accordance with the recording mode.

One constraint imposed is that recording in the high band mode or the super high band mode cannot be carried out using "ordinary" or "normal" tape. In the case of recording in the high band mode or the super high band mode, it is necessary to use a tape that will accept a high density recording. Such a tape can of course also be used for recording in the normal mode, in which the recording is of a lower density.

As mentioned above, in a VTR capable of operating in either the normal mode or the high band mode, it is necessary to switch various setting states in accordance with the recording mode selected.

It is very troublesome to execute such a setting operation manually. Moreover, when such a setting operation is manually performed, mistakes are often made. For instance, in spite of the fact that a normal tape has been loaded, the high band mode may be set. In such a case, normal mode recording is not executed. Moreover, high band mode recording is not properly executed, since the tape is not capable of accepting a recording of the requisite density. Alternatively, in spite of the fact that a tape for the high band has been loaded, the normal recording mode may be set. In such a case, the recording will be carried out, but without achieving the picture quality of which the loaded tape is capable.

OBJECTS AND SUMMARY OF THE INVENTION

It is, therefore, an object of the present invention to remedy the problems of the prior art outlined above.

In particular, an object of the invention is to provide an improved recording apparatus that can automatically set the recording mode in accordance with the kind of tape that has been loaded into the recording apparatus, thereby preventing the errors that tend to accompany a manual setting of the recording mode, but that can optionally be made to record in the normal mode even on a tape for the high band, thereby enabling the apparatus to be used in a manner that is very flexible.

The foregoing and other objects are attained in accordance with the invention by providing recording apparatus that can be set selectively into at least a first mode for frequency modulating a luminance signal by using a carrier of a given frequency or a second mode for frequency modulating the luminance signal by using a carrier of a second frequency higher than the given frequency and that records the frequency modulated signal on a magnetic tape housed in a tape cassette; wherein the magnetic tape in the tape cassette is on of a plurality of kinds and the tape cassette is formed with means indicating the kind of magnetic tape; the magnetic apparatus comprising: detecting means cooperating with the tape cassette for detecting the kind of magnetic tape in the tape cassette; controller means responsive to the detecting means for automatically setting one of the first and second modes in accordance with the kind of magnetic tape detected; and mode setting means connected to the controller means for selectively preventing the controller means from setting the second mode while enabling the controller means to set the first mode is irrespective of the kind of magnetic tape detected.

The kind of tape that has been loaded into the recording apparatus can be detected on the basis of the states of a "tape kind" detecting hole and another detecting hole that are formed in the bottom surface of the tape cassette. A recording mode can be automatically set in accordance with the kind of tape detected. On the other hand, it is possible to cancel the high band automatic recording mode, and in that case it is possible to record in the normal mode using a tape for the high band.

The foregoing and other objects, features and advantages of the present invention will become readily apparent form the following detailed description thereof, which is to be read in conjunction with the accompanying drawings.

BRIEF DESCRIPTION OF THE DRAWINGS

FIG. 2 and 3 are schematic diagrams that are used in explanation of the operation of the present invention;

DESCRIPTION OF THE PREFERRED EMBODIMENTS

An embodiment of the present invention will be described hereinbelow with reference to the drawings. This embodiment is one in which the principles of the present invention are applied to an 8-mm VTR. The invention can of course be applied to other types of VTRs, as those skilled in the art will appreciate.

Figure 5:
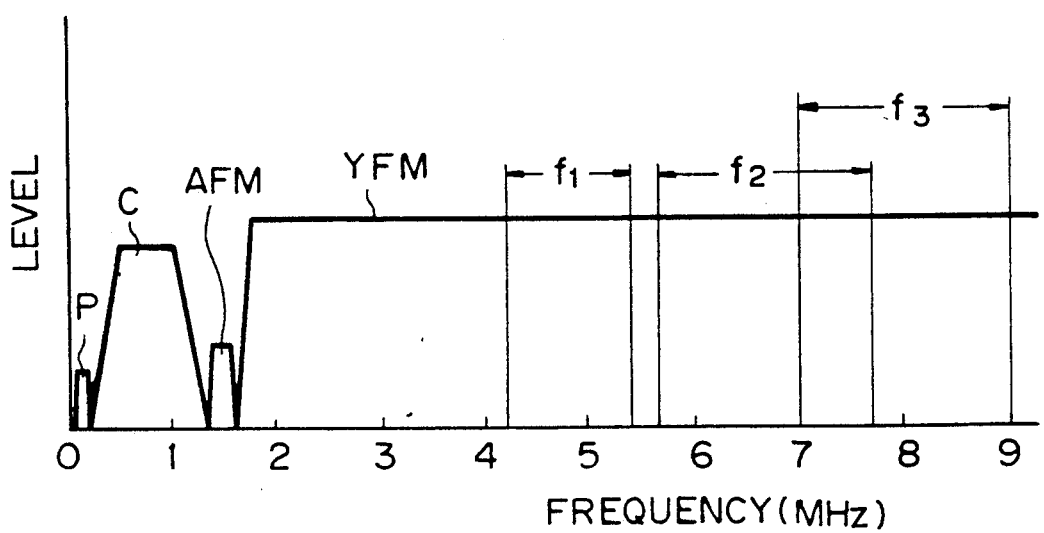
FIG. 5 is a frequency characteristic diagram used in explanation of the recording modes of the apparatus of FIG. 4.

In the recording format of the 8-mm VTR, as shown by $f_1$ in FIG. 5, the carrier frequency when the luminance signal is frequency modulated is set to 4.2 MHz at the sync tip level and 5.4 MHz at the white peak level. In FIG. 5, $Y_{fm}$ denotes a frequency modulated luminance signal, C a low band converted chroma signal, $A_{fm}$ a frequency modulated audio signal, and P a spectrum of a pilot signal for ATF (automatic track finding). This recording mode is called a normal mode.

In the 8-mm VTR, in order to realize improved picture quality, as shown by $f_2$ in FIG. 5, the carrier frequency when the luminance signal is frequency modulated is set to 5.7 MHz at the sync tip level and 7.7 MHz at the white peak level. This recording mod is called a high band mode. In order to improve the picture quality still further, as shown by $f_3$ in FIG. 5, the carrier frequency when the luminance signal is frequency modulated is set to 7.0 MHz at the sync tip level and 9.0 MHz at the white peak level. This recording mode is called a super high band mode.

Figure 1:
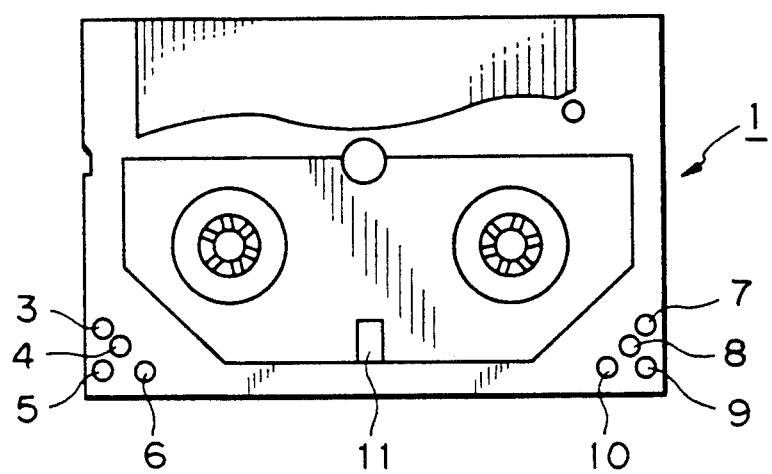
FIG. 1 is a bottom view of a tape cassette adapted to be loaded into recording apparatus constructed in accordance with the present invention.

FIG. 1 is a bottom view of a tape cassette that is loaded into the 8-mm VTR to which the present invention is applied. Although not shown, a supply reel and a take-up reel are enclosed in the tape cassette 1. A magnetic tape having a width of 8 mm is wound between the supply reel and the take-up reel.

There are three kinds of tape cassettes: a tape cassette for an MP tape (coating type metal tape) for the normal mode (hereinafter abbreviated as a normal MP tape cassette); a tape cassette for an MP tape for the high band (hereinafter abbreviated as a high MP tape cassette); and a tape cassette for an ME tape (evaporation tape) for the high band (hereinafter abbreviated as a high ME tape cassette). The MP tape (coating type metal tape) is formed by coating ultrafine particles of an alloy in which nickel and cobalt are mixed with iron on a base material together with a binder. The MP tape is excellent in quality stability and uniformity and well suited to mass production. The ME tape is formed by vacuum evaporation of an alloy in which nickel is contained in cobalt and depositing the evaporated alloy onto a base material. Although the performance of the ME tape is higher than that of the coating type metal tape, it is difficult to achieve mass production of the ME tape.

The three kinds of tape cassettes (normal MP tape cassette, high MP tape cassette, and high ME tape cassette) are known per se and can be discriminated from the states of a first detecting hole 4 and a "tape kind" detecting hole 6.

That is, in FIG. 1, a positioning hole 3, the detecting hole 4, a detecting hole 5 to prevent erroneous erasure, the tape kind detecting hole 6, a positioning hole 7, a spare detecting hole 8, and tape thickness detecting holes 9 and 10 are formed in the bottom surface of the tape cassette 1.

The tape kind detecting hole 6 is provided to indicate whether the ME tape or the MP tape is used. If the tape cassette 1 is one using the ME tape, that is, a high ME tape cassette, the tape kind detecting hole 6 is open (FIG. 2). If the tape cassette 1 is one using the MP tape, that is, a normal MP tape cassette or a high MP tape cassette, the tape kind detecting hole 6 is closed.

The detecting hole 4 is provided to indicate whether the high MP tape cassette or the normal MP tape cassette is used. If the tape cassette 1 is a high MP tape cassette, the detecting hole 4 is open. If the tape cassette 1 is a normal MP tape cassette, the detecting hole 4 is closed. Even in the case where the tape cassette 1 is a high ME tape cassette, the detecting hole 4 is closed. Therefore, as FIG. 2 shows, three kinds of tape cassettes can be detected from the states of the detecting hole 4 and the tape kind detecting hole 6.

In accordance with the present invention, the high band automatic recording mode can be set. When the high band automatic recording mode has been set, the recording mode is automatically set in accordance with the kind of tape detected.

That is, if the tape kind detecting hole 6 is open and the detecting hole 4 is closed, it is determined that the tape cassette loaded into the recording apparatus is a high ME tape cassette. In this case, the recording is executed in the high band mode. If the tap kind detecting hole 6 is closed and the detecting hole is open, it is determined that the tape cassette loaded into the recording apparatus is a high MP tape cassette. In this case, the recording is executed in the high band mode.

The characteristics of the recording amplifier and the like are switched automatically in accordance with whether the high band recording is executed by using a high ME tape cassette or by using a high MP tape cassette.

If the tape kind detecting hole 6 is closed and the detecting hole 4 is closed, it is determined that the tape cassette loaded into the apparatus is a normal MP tape cassette. In this case, the recording is executed in the normal mode.

If the recording mode is automatically set in accordance with the kind of tape detected as mentioned above, three kinds of recording states can be obtained: one is the recording state in which the recording is executed in the high band mode by using the high ME tape cassette; a second is the recording state in which the recording is executed in the high band mode by using the high MP tape cassette; and the third is the recording state in which the recording is executed in the normal mode by using the normal MP tape cassette.

However, if the recording mode is automatically set in accordance with the kind of tape detected a described above, it is impossible to obtain a recording state in which the recording is executed in the normal mode by using the high ME tape cassette or to obtain a recording state in which the recording is executed in the normal mode by using the high MP tape cassette.

Therefore, in the accordance with the present invention, the high band automatic recording mode can be cancelled. When the high band automatic recording mode is cancelled, the recording is executed in the normal mode irrespective of the kind of tape cassette that has been loaded into the recording apparatus. Therefore, it is possible to set a recording state in which the recording is executed in the normal mode by using the high ME tape cassette and also to set a recording state in which the recording is executed in the normal mode by using the high MP tape cassette. Thus, a total of five kinds of recording states can be obtained.

In a tape cassette that can be recorded in the super high band mode in which the carrier frequency is raised higher than that in the high band mode and the picture quality is further improved, an ME tape is used. A tape that can be recorded in the super high band mode is hereinafter called a super high ME tape. In the super high ME tape, as shown in FIG. 3, the tape kind detecting hole 6 is open and the detecting hole 4 is also open.

In the case of the VTR in which the super high band mode can be set, when the automatic super high band recording mode has been set, if the tape kind detecting hole 6 is open and the detecting hole 4 is open, it is determined that the loaded tape cassette is a super high ME tape cassette. In this case, the recording is executed in the super high band mode.

In the case of a VTR in which the super high band mode can be set, it is possible to set the automatic super high band recording mode, the automatic high band recording mode, and a state in which both the automatic super high band recording mode and the automatic high band recording mode ar turned off. If the automatic high band recording mode has been set, the recording is executed in the high band mode even if the loaded tape cassette is determined to be a super high ME tape cassette. If the state in which the automatic super high band recording mode and the automatic high band mode are off has been set, the recording is executed in the normal mode irrespective of the kind of tape cassette that has been loaded into the recording apparatus.

Figure 4:
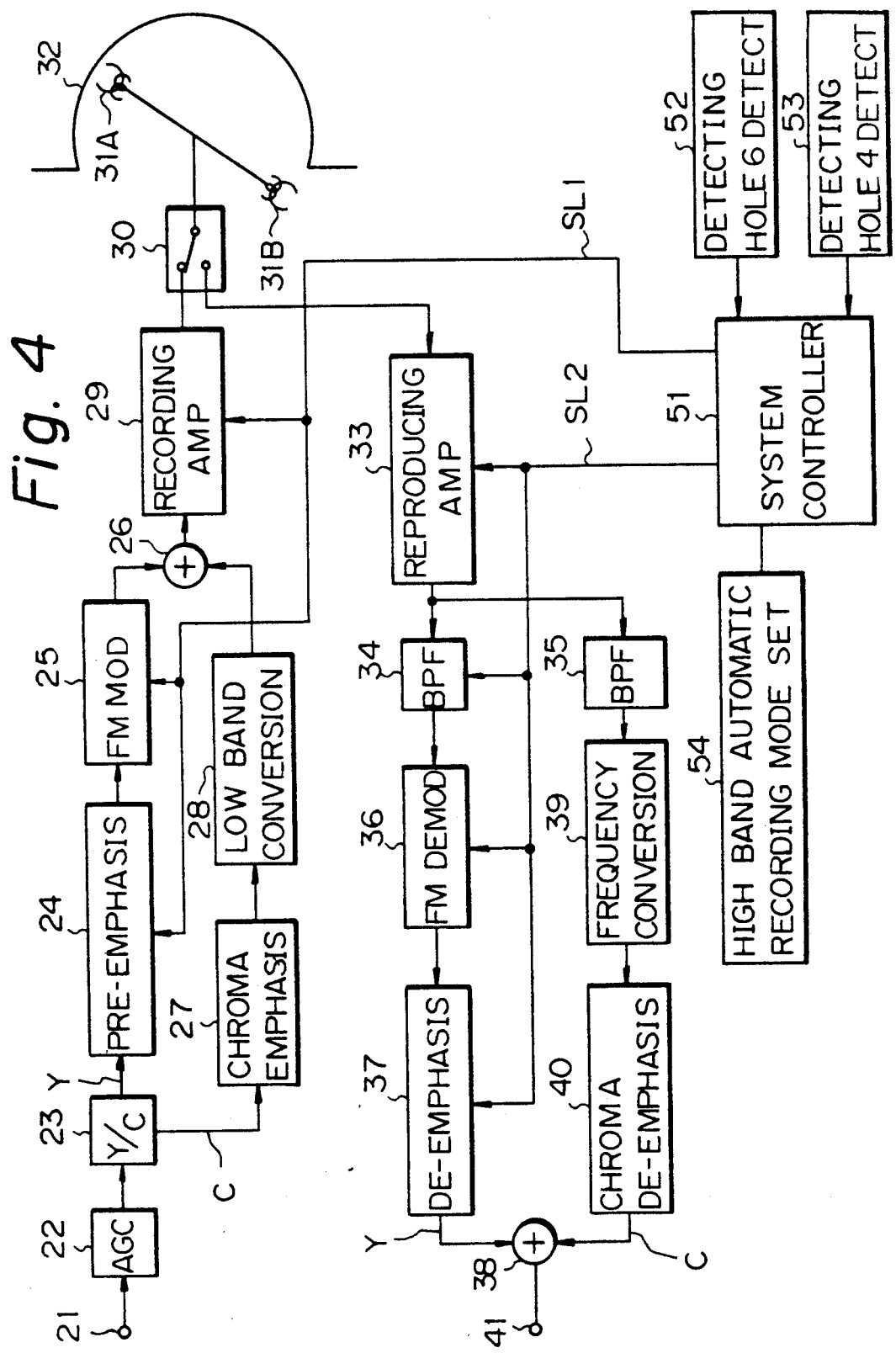
FIG. 4 is a block diagram of a preferred embodiment of recording apparatus constructed in accordance with the present invention.

FIG. 4 shows a construction of the VTR to which the present invention is applied.

In FIG. 4, a video signal is supplied from an input terminal 21. The video signal is supplied to a Y/C (luminance/chroma) separating circuit 23 through an AGC (automatic gain control) circuit 22. The video signal is separated by the Y/C separating circuit 23 into the luminance signal Y and the chroma signal C.

The separated luminance signal Y is supplied to an FM modulating circuit 25 through a pre-emphasis circuit 24. An output of the FM modulating circuit 25 is supplied as one input to an adding circuit 26.

The separated chroma signal C is supplied to a low band converting circuit 28 through a chroma emphasis circuit 27. The chroma signal C is converted into a low band frequency by the low band converting circuit 28. An output of the low band converting circuit 28 is supplied as a second input to the adding circuit 26.

The FM modulated luminance signal from the FM modulating circuit 25 and the low band converted chroma signal from the low band converting circuit 28 are frequency division multiplexed by the adding circuit 26. An output of the adding circuit 26 is supplied to rotary heads 31A and 31B through a recording amplifier 29 and a switching circuit 30. The video signal is recorded on a magnetic tape 32 by the rotary heads 31A and 31B.

At the time of reproduction, the recorded signal on the magnetic tape 32 is reproduced by the rotary heads 31A and 31B and is supplied through a reproducing amplifier 33 to band-pass filters 34 and 35. The FM modulated luminance signal is extracted by the band pass filter 34. This signal is supplied to an FM demodulating circuit 36, which demodulates the luminance signal. The demodulated luminance signal Y is supplied to an adding circuit 38 through a de-emphasis circuit 37.

The low band converted chroma signal is extracted by the band-pass filter 35 and supplied to a frequency converting circuit 39. The low band converted chroma signal is converted back to the chroma signal of a frequency of 3.58 MHz by the frequency converting circuit 39. An output of the frequency converting circuit 39 is supplied to the adding circuit 38 through a chroma de-emphasis circuit 40 as a chroma signal C.

The chroma signal C is multiplexed to the luminance signal Y by the adding circuit 38. The composite color video signal formed as explained above is extracted from an output terminal 41.

At the time of recording the video signal, it is necessary to switch the characteristics of the pre-emphasis circuit 24, the FM modulating circuit 25, and the recording amplifier 2 in accordance with the recording mode. A switching signal SL1 is supplied as an output from a system controller 51. The characteristics of the pre-emphasis circuit 24, the FM modulating circuit 25, and the recording amplifier 29 are switched by the switching signal SL1.

At the time of reproducing the video signal, it is necessary to switch the characteristics of the reproducing amplifier 33, the band-pass filter 34, the FM demodulating circuit 36, and the de-emphasis circuit 37 in accordance with the recording mode of the video signal recorded on the magnetic tape 32. A switching signal SL2 is supplied as a further output from the system controller 51. The characteristics of the reproducing amplifier 33, the band-pass filter 34, the FM demodulating circuit 36, and the de-emphasis circuit 37 are switched by the switching signal SL2.

As explained above, in accordance with the present invention, the high band automatic recording mode can be set; and, when the high band automatic recording mode has been set, the recording mode is automatically set in accordance with the kind of tape detected.

For this purpose, a detecting mechanism 52 to detect the state of the tape kind detecting hole 6 and a detecting mechanism 53 to detect the state of the detecting hole 4 are provided. The detecting mechanisms 52 and 53 may for example comprise pins (not shown) that are arranged vertically at positions corresponding to the tape kind detecting hole 6 and the detecting hole 4 when the tape cassette 1 is loaded; and switching mechanisms that are turned on or off and are interlocked with the pins. If the tape kind detecting hole 6 and the detecting hole 4 are closed, the pins are pressed and the switches that are interlocked therewith are, for instance, turned on. If the tape kind detecting hole 6 and the detecting hole 4 are open, the pins are, for instance, not pressed and the switches that are interlocked therewith are held in the off state. Of course, the arrangement can be reversed so that the switches are turned off when the pins are pressed and on when the pins are not pressed. Moreover, the location of the holes can be varied, and other kinds of indicators of the kind of tape housed in the tape cassette loaded into the recording apparatus can be employed.

Moreover, a high band automatic recording mode setting switch 54 is provided. An output of the high band automatic recording mode switch 54 is supplied to the system controller 51. The high band automatic recording mode can be selectively set or cancelled by the high band automatic recording mode setting switch 54.

If the high band automatic recording mode has been set, the recording mode is automatically set in accordance with the states of the tap kind detecting hole 6 and the detecting hole 4, which are detected by the detecting mechanisms 52 and 53 as mentioned above. If the high band automatic recording mode is cancelled, the low band mode is always set, irrespective of the kind of tape cassette that has been loaded into the recording apparatus.

In the case of the VTR in which the super high band mode can be set, the high band automatic recording mode setting switch 54 can be switched to any of three states: the automatic super high band recording state; the automatic high band recording state; and a state in which the automatic super high band recording mode and the automatic high band recording mode ar both turned off. If the automatic high band recording state has been set, the recording is executed in the high band mode even if the loaded tape cassette is determined to be the super high band ME tape cassette. If the state in which both the automatic super high band recording mode and the automatic high band recording state are off has been set, the recording is executed in the normal mode irrespective of the kind of tape cassette that has been loaded into the recording apparatus.

According to the present invention, the kind of the tape cassette that has been loaded into the recording apparatus can be determined from the states of the tape kind detecting hole 6 and the detecting hole 4 that are formed in the bottom surface of the tape cassette 1, and the recording mode can be automatically set in accordance with the kind of tape detected. In addition, if the high band automatic recording mode is cancelled, the recording can be executed in the normal mode, even using a tape for the high band.

A specific preferred embodiment of the present invention and modifications thereof have been described with reference to the accompanying drawings. It is to be understood that the invention is not limited to those precise structures, and that various changes and modifications may be effected therein by one skilled in the art without departing from the scope or the spirit of the invention a defined in the appended claims.

We claim:

1. Recording apparatus that can be set selectively into at least a first mode for frequency modulating a luminance signal by using a carrier having a frequency of substantially 4.2 MHz corresponding to a sync tip level and a frequency of substantially 5.4 MHz corresponding to a white peak level, a second mode for frequency modulating the luminance signal by using a carrier having a frequency of substantially 5.7 MHz corresponding to a sync tip level and a frequency of substantially 7.7 MHz corresponding to a white peak level, and a third mode for frequency modulating the luminance signal by using a carrier having a frequency of substantially 7.0 MHz corresponding to a sync tip level and a frequency of substantially 9.0 MHz corresponding to a white peak level and that records the frequency modulated signal on a magnetic tape housed in a tape cassette; wherein the magnetic tape in the tape cassette is one of a plurality of kinds and the tape cassette is formed with means indicating the kind of magnetic tape; said recording apparatus comprising:

detecting means cooperating with the tape cassette for detecting the kind of magnetic tape in the tape cassette;

controller means responsive to said detecting means for automatically setting one of the first, second and third modes in accordance with the kind of magnetic tape detected; and mode setting means connected to the controller means and switchable to an automatic super high band recording state enabling recording in said third mode, in said second mode, or in said first mode; to a high band recording state enabling recording in said second mode or in said first mode; and to a canceled state enabling recording in said first mode.

2. Recording apparatus according to claim 1 wherein said means indicating the kind of magnetic tape comprises at least two locations on said tape cassette in which holes may be formed or not formed and said means for detecting the kind of magnetic tape comprises at least two hole detecting means respectively cooperating with said tape cassette at said locations.

3. Recording apparatus according to claim 1 wherein said recording apparatus includes pre-emphasis means, modulation means and amplifying means and said controller means generates a switching signal for setting characteristics of the pre-emphasis means, the modulation means and the amplifying means in accordance with the set mode.

4. Recording apparatus according to claim 3 which is also capable of playback and includes reproducing amplifying means, filter means and demodulation means and wherein said controller means generates a second switching signal for setting characteristics of the reproducing amplifying means, the filter means and the demodulation means in accordance with the set mode.

* * * * *